United States Patent Office.

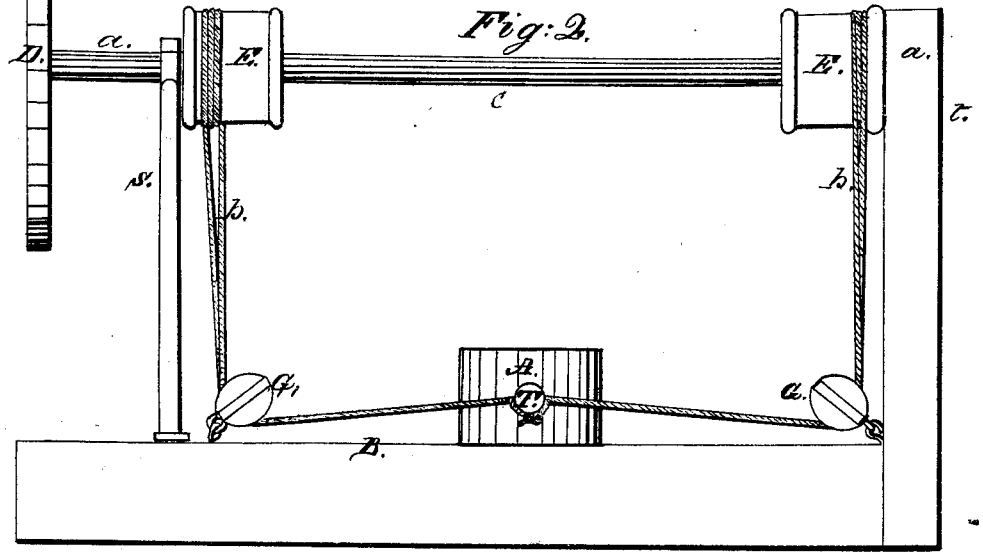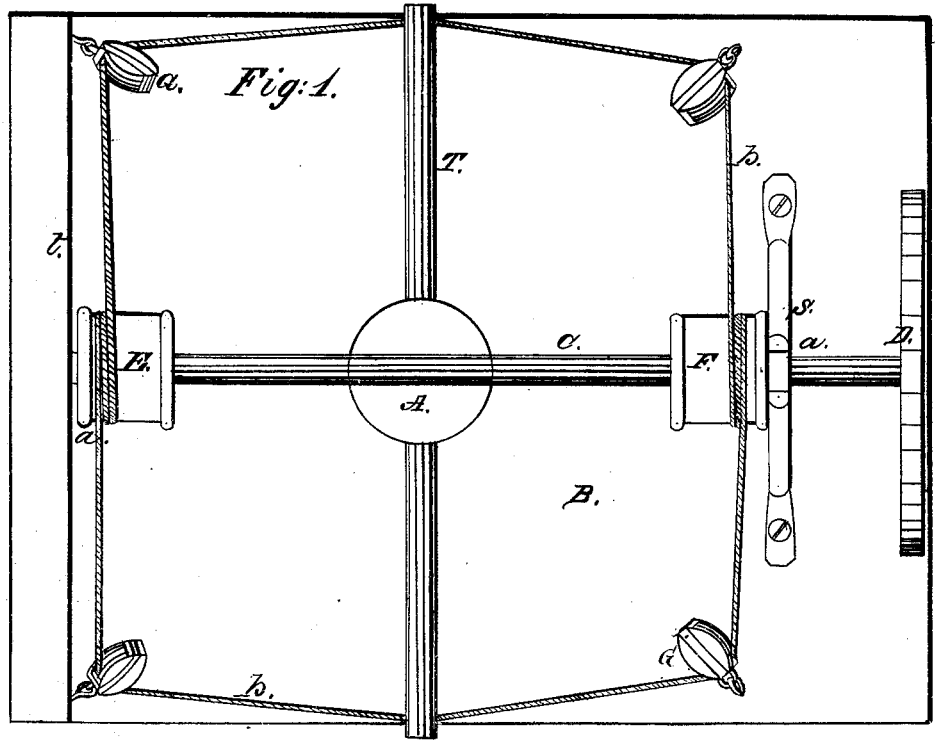

WILLIAM H. FOSTER, OF PORTSMOUTH, NEW HAMPSHIRE, ASSIGNOR TO HIMSELF AND MICHAEL R. PERKINS, OF THE SAME PLACE.

Letters Patent No. 69,558, dated October 8, 1867.

IMPROVED STEERING APPARATUS.

*The Schedule referred to in these Letters Patent and making part of the same.*

TO ALL PERSONS TO WHOM THESE PRESENTS MAY COME:

Be it known that I, WILLIAM H. FOSTER, of Portsmouth, in the county of Rockingham, and State of New Hampshire, have invented an improved Steering Apparatus for navigable vessels; and I do hereby declare the same to be fully described in the following specification, and represented in the accompanying drawings, of which—

Figure 1 is a top view, and
Figure 2 a side elevation of it.

In such drawings, A denotes a rudder-head rising above a deck, B, and having a tiller, T, extending through it diametrically, and projecting at equal distances in opposite directions from it. Over the said rudder-head is a long shaft, C, duly supported in boxes $a\ a$, in posts or standards $s\ t$, and provided with a hand-wheel, D, by which it may be revolved. Fixed on the shaft are two windlass-pulleys, E F, which are arranged with reference to the rudder-head in manner as represented. From each of these pulleys a single rope or two ropes, $b\ b$, proceed in opposite directions, and go through guide-blocks G G, fastened to the deck. From these blocks the rope or ropes are attached to the opposite ends of the tiller, the whole being as shown in the said drawings. By revolving the hand-wheel in one direction the rudder will be turned to "port." By revolving the hand-wheel in the opposite way, the rudder will be to "starboard." The rope or ropes of one pulley, E, should wind thereon in a direction opposite to that in which the rope or ropes of the other pulley, F, may be wound on the latter, the same being in order that while either rope attached to either end of the tiller may be moving the tiller, the other rope may be correspondingly unwinding from its windlass-pulley.

From the above it will be seen that the tiller, while being moved, will be acted on by forces applied to its opposite ends, one operating to force it one way, and the other the other. In case of breakage of either rope of either windlass-pulley, the tiller may still be moved by the other windlass-pulley and its rope or ropes. This is a great advantage at sea, and may often prove the means of saving a vessel from destruction or loss. The apparatus is a duplex mechanism, operates with a duplex action, is certain and easy in its operation, simple in construction, and can be readily repaired when it may get out of order.

I am aware that a shaft having a windlass-pulley and two leading-ropes has been applied to the tiller of a rudder by means of blocks attached to the deck of a vessel, and therefore I make no claim to such, in which case the tiller is projected in one direction only from the rudder-head. With my invention it goes diametrically through and projects in opposite directions from such head, and is operated by two windlass-pulleys, with their ropes and blocks. Therefore, what I claim as my invention, is—

The arrangement and combination of the two windlass-pulleys E F, and their ropes $b\ b'$, and four leading-blocks G, with the single hand-wheel shaft C, and with the tiller T extended in opposite directions from the rudder-head A, the whole being substantially as hereinbefore explained and as represented.

WILLIAM H. FOSTER.

Witnesses.
AARON YOUNG,
J. M. EDMONDS.